(12) United States Patent
Jang et al.

(10) Patent No.: US 9,191,170 B2
(45) Date of Patent: Nov. 17, 2015

(54) METHOD FOR TRANSRECEIVING REFERENCE SIGNAL IN WIRELESS ACCESS SYSTEM AND APPARATUS FOR SAME

(71) Applicant: LG ELECTRONICS INC., Seoul (KR)

(72) Inventors: Jiwoong Jang, Anyang-si (KR); Hyunsoo Ko, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/353,727

(22) PCT Filed: Nov. 5, 2012

(86) PCT No.: PCT/KR2012/009233
§ 371 (c)(1),
(2) Date: Apr. 23, 2014

(87) PCT Pub. No.: WO2013/066126
PCT Pub. Date: May 10, 2013

(65) Prior Publication Data
US 2014/0269641 A1    Sep. 18, 2014

Related U.S. Application Data

(60) Provisional application No. 61/554,987, filed on Nov. 3, 2011, provisional application No. 61/556,287, filed on Nov. 7, 2011.

(51) Int. Cl.
*H04J 3/06* (2006.01)
*H04L 5/00* (2006.01)
(Continued)

(52) U.S. Cl.
CPC ........... *H04L 5/0048* (2013.01); *H04J 11/0073* (2013.01); *H04L 5/0053* (2013.01); *H04W 56/00* (2013.01); *H04W 56/002* (2013.01); *H04W 76/023* (2013.01)

(58) Field of Classification Search
CPC .... H04B 7/2045; H04B 7/208; H04B 7/2125; H04B 7/2126; H04B 7/2621; H04B 7/2662; H04L 2012/5608; H04W 56/00; H04W 56/0045; H04J 2011/0096
USPC ......... 370/319, 324, 344, 350, 304, 322, 329, 370/330, 341, 348
See application file for complete search history.

(56) References Cited

U.S. PATENT DOCUMENTS 8,259,776 B2 *   9/2012   Lee et al. ................... 375/135
8,279,825 B2 *  10/2012   Koo et al. .................. 370/329
(Continued)

FOREIGN PATENT DOCUMENTS

KR    1020050059169 A    6/2005
KR    1020090043696 A    5/2009
(Continued)

*Primary Examiner* — Brenda H Pham
(74) *Attorney, Agent, or Firm* — Dentons US LLP

(57) ABSTRACT

In the present invention, disclosed are a method for transceiving a reference signal in a wireless access system supporting device-to-device communication, and apparatus for same. More particularly, comprised are the steps of: a first device transmitting the reference signal for aligning device-to-device synchronization with a second device; and the first device performing device-to-device communication with the second device performing device-to-device synchronization with the second device after obtaining synchronization with the second device, wherein the reference signal is mapped on a predetermined symbol inside a resource that is allocated for device-to-device communication with the second device.

18 Claims, 14 Drawing Sheets

(51) Int. Cl.
*H04W 56/00* (2009.01)
*H04W 76/02* (2009.01)
*H04J 11/00* (2006.01)

(56) References Cited

U.S. PATENT DOCUMENTS

| | | | |
|---|---|---|---|
| 8,340,122 B2* | 12/2012 | Lee et al. | 370/464 |
| 8,582,486 B2* | 11/2013 | Noh et al. | 370/312 |
| 8,885,739 B2* | 11/2014 | Noh et al. | 375/260 |
| 8,917,681 B2* | 12/2014 | Ko et al. | 370/329 |
| 2010/0246491 A1* | 9/2010 | Bae et al. | 370/328 |
| 2011/0128909 A1* | 6/2011 | Luo et al. | 370/328 |
| 2011/0149944 A1* | 6/2011 | Ko et al. | 370/344 |
| 2012/0020323 A1* | 1/2012 | Noh et al. | 370/330 |
| 2012/0120885 A1* | 5/2012 | Wang et al. | 370/329 |
| 2012/0250656 A1* | 10/2012 | Noh et al. | 370/330 |
| 2013/0195034 A1 | 8/2013 | Noh et al. | |

FOREIGN PATENT DOCUMENTS

| | | |
|---|---|---|
| KR | 1020110089311 A | 8/2011 |
| KR | 1020110117032 A | 10/2011 |

* cited by examiner

FIG. 6
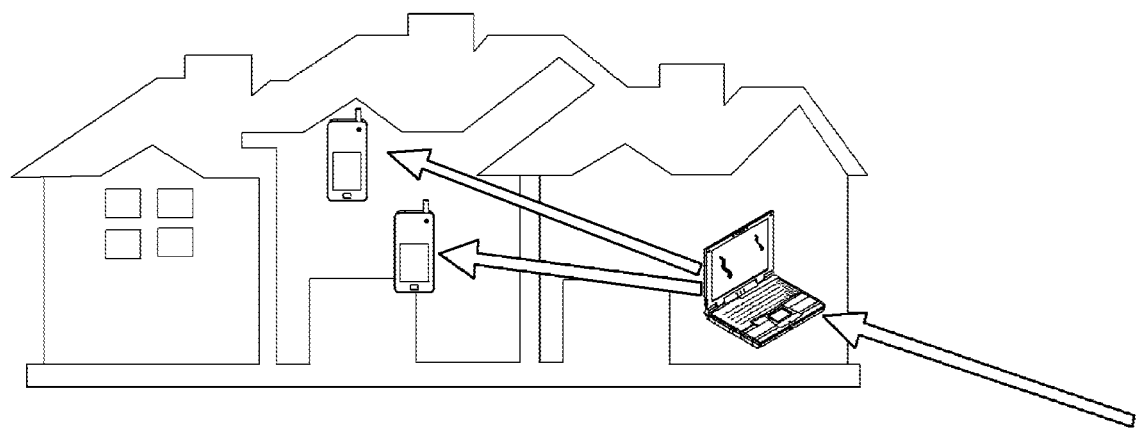
(a)
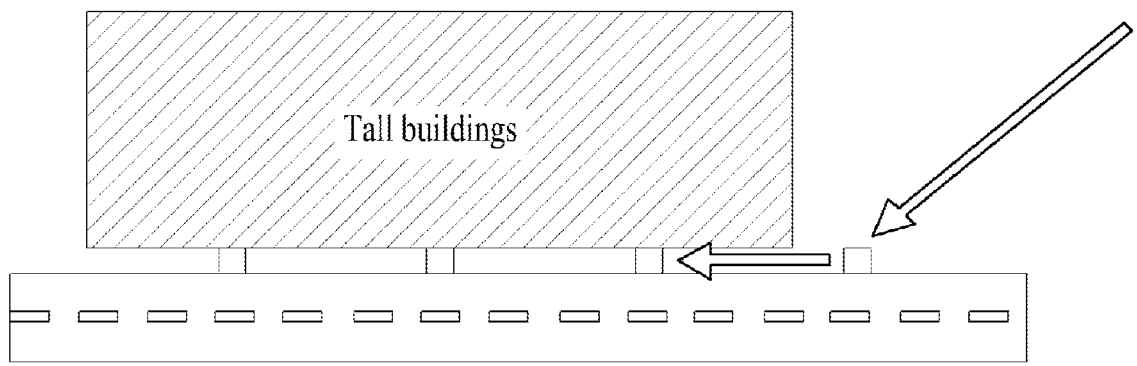
(b)

FIG. 7
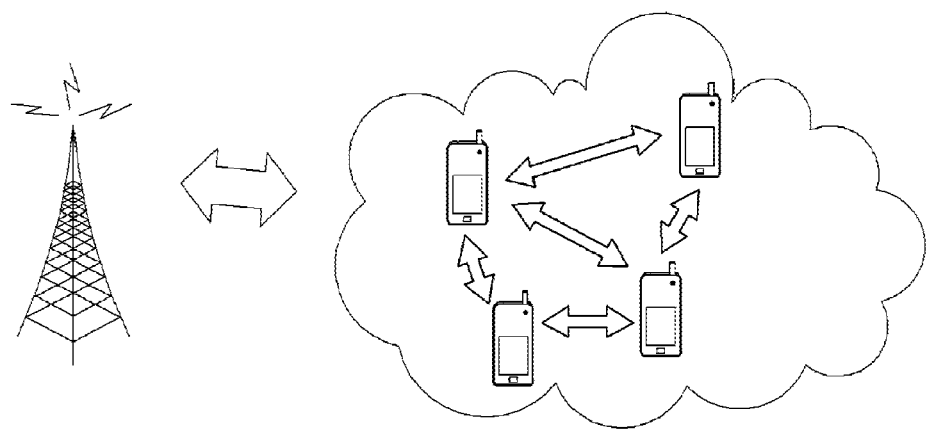
(a)
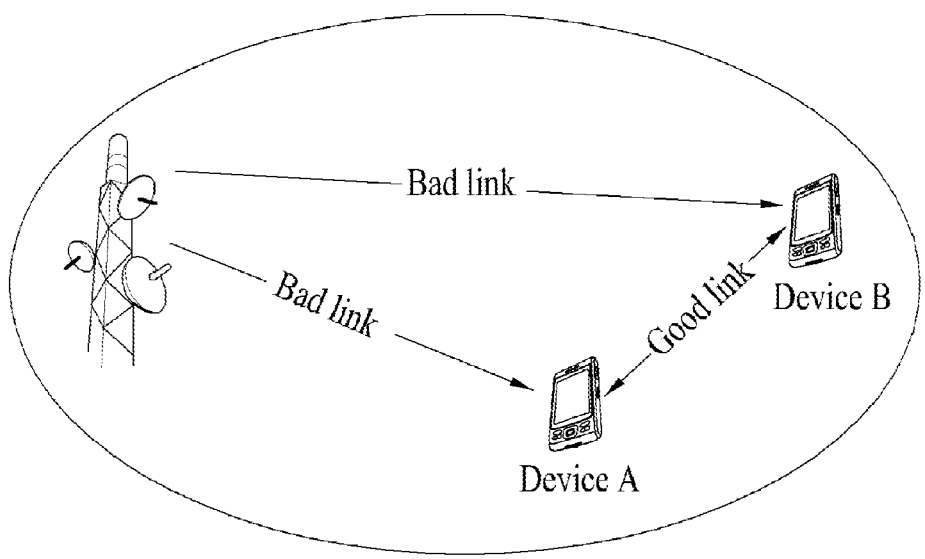
(b)

METHOD FOR TRANSRECEIVING REFERENCE SIGNAL IN WIRELESS ACCESS SYSTEM AND APPARATUS FOR SAME

This application is a National Stage Application of International Application No. PCT/KR2012/009233 filed Nov. 5, 2012, and claims priority to and the benefit of U.S. Provisional Application No. 61/554,987, filed on Nov. 3, 2011, and U.S. Provisional Application No. 61/556,287, filed on Nov. 7, 2011, the disclosures of which are incorporated by reference herein in their entirety.

TECHNICAL FIELD

The present invention relates to a wireless access system, and more particularly, to a method of transceiving a reference signal in a wireless access system supportive of a device-to-device communication and apparatus therefor.

BACKGROUND ART

In a cellular communication, a user equipment existing in a cell accesses a base station to perform communication, receives control information for exchanging data from a base station, and then transceives data with the base station. In particular, since the user equipment transceives data through the base station, in order to transmit data to another cellular user equipment, the user equipment transmits its data to the base station. Having received the data, the base station transmits the received data to another user equipment. Thus, since data can be transmitted through the base station in order for one user equipment to transmit data to another user equipment, the base station performs scheduling of channels and resources for the data transceiving and also transmits channel and resource scheduling information to each user equipment. Thus, in order to perform a device-to-device (hereinafter abbreviated D2D) communication through the base station, each user equipment needs channel and resource allocations to transceive data with the base station. Yet, according to the structure of the D2D communication, one user equipment directly transceives signals with another user equipment, to which data shall be transmitted, without using a base station or a relay node.

If a D2D communication for transceiving data in direct between user equipments is performed in a manner of sharing resources with an existing cellular network mentioned in the above description, it may cause a problem, to a user equipment currently performing the D2D communication, that synchronization with a user equipment currently performing a D2D communication with the cellular network is mismatched or a problem that synchronization between user equipments currently performing D2D communications with different user equipments is mismatched.

DISCLOSURE OF THE INVENTION

Technical Tasks

One object of the present invention is to provide a method of efficiently transceiving data between user equipments in a D2D communication supportive wireless access system and apparatus therefor.

Another object of the present invention is to provide a method of configuring a D2D (device-to-device) synchronization such that a D2D communication can be efficiently performed and apparatus therefor.

A further object of the present invention is to provide a method of minimizing occurrence of interference between a user equipment of a cellular network and user equipment currently performing a D2D communication in case of performing the D2D communication by sharing resource with the cellular network and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In an aspect of the present invention, disclosed herein is a method of transmitting a reference signal in a wireless access system supportive of a D2D (device-to-device) communication, the method comprising transmitting the reference signal by a first device to acquire D2D synchronization with a second device; and performing the D2D communication with the second device by the first device after acquiring synchronization with the second device, wherein the reference signal is mapped to a predetermined symbol in a resource allocated for the D2D communication with the second device.

In another aspect of the present invention, disclosed herein is a device configured to transmit a reference signal in a wireless access system supportive of a D2D (device-to-device) communication, the device comprising an RF (radio frequency) unit configured to transceive radio signals; and a processor configured to transmit the reference signal from the device to acquire D2D synchronization with another device, and perform the D2D communication with the another device by the device after acquiring synchronization with the another device, wherein the reference signal is mapped to a predetermined symbol in a resource allocated for the D2D communication with the another device.

In an aspect of the present invention, disclosed herein is a method of receiving a reference signal in a wireless access system supportive of a D2D (device-to-device) communication, the method comprising receiving the reference signal by a first device to acquire D2D synchronization with a second device; and performing the D2D communication with the second device by the first device after acquiring synchronization with the second device, wherein the reference signal is mapped to a predetermined symbol in a resource allocated for the D2D communication with the second device.

In another aspect of the present invention, disclosed herein is a device configured to receive a reference signal in a wireless access system supportive of a D2D (device-to-device) communication, the device comprising an RF (radio frequency) unit configured to transceive radio signals; and a processor configured to receive the reference signal by the device to acquire D2D synchronization with another device, and perform the D2D communication with the another device by the device after acquiring synchronization with the another device, wherein the reference signal is mapped to a predetermined symbol in a resource allocated for the D2D communication with the another device.

Preferably, the reference signal is mapped to a center symbol of 1 or 2 slots in each subframe.

Preferably, the reference signal is mapped across a full band of a frequency band of a resource allocated for the D2D communication between the first device and the second device.

Preferably, the reference signal includes a demodulation reference signal (DMRS).

Preferably, the reference signal is mapped to a partial band of a frequency band of the resource allocated for the D2D communication between the first device and the second device.

Preferably, the reference signal is mapped consecutively or distributively by a unit of one or more resource elements.

Preferably, the reference signal is used for synchronization correction and channel estimation after acquiring the synchronization with the second device.

Advantageous Effects

According to an embodiment of the present invention, data can be efficiently transceived between user equipments in a wireless access system, and more particularly, in a D2D communication supportive wireless access system.

According to an embodiment of the present invention, synchronization between user equipments performing a D2D communication can be efficiently set.

According to an embodiment of the present invention, occurrence of interference between a user equipment of a cellular network and a user equipment currently performing a D2D communication can be minimized.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 and FIG. 7 are diagrams for examples of applying a D2D communication.

BEST MODE FOR INVENTION

Figure 1:
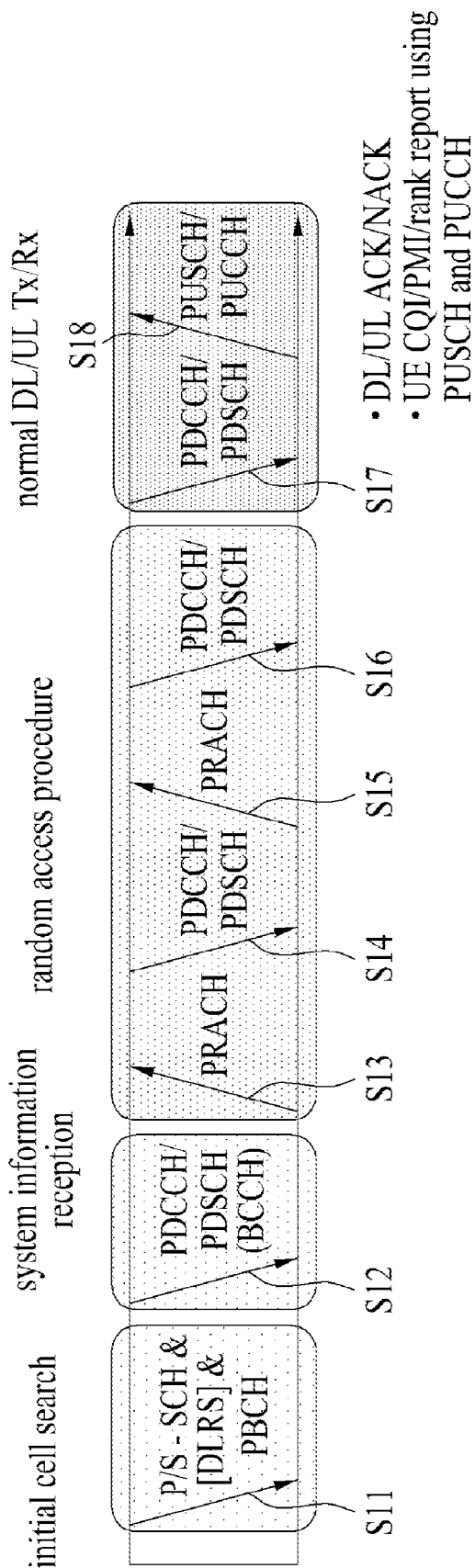
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transceiving relation between a base station and a device. In this case, the base station may be meaningful as a device node of a network which directly performs communication with the device. In this disclosure, a specific operation explained as performed by a base station may be performed by an upper node of the base station in some cases. In particular, in a network constructed with a plurality of network nodes including a base station, it is apparent that various operations performed for communication with a device can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'device' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE—A System to which the Present Invention is Applicable

FIG. 1 is a diagram for explaining physical channels used for 3GPP system and a signal transmission using the same.

First of all, if a power of a user equipment is turned on or the user equipment enters a new cell, the user equipment may perform an initial cell search job for acquiring synchronization with a base station and the like [S11]. To this end, the user equipment may receive a primary synchronization channel (P-SCH) and a secondary synchronization channel (S-SCH) from the base station, may acquire synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Subsequently, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
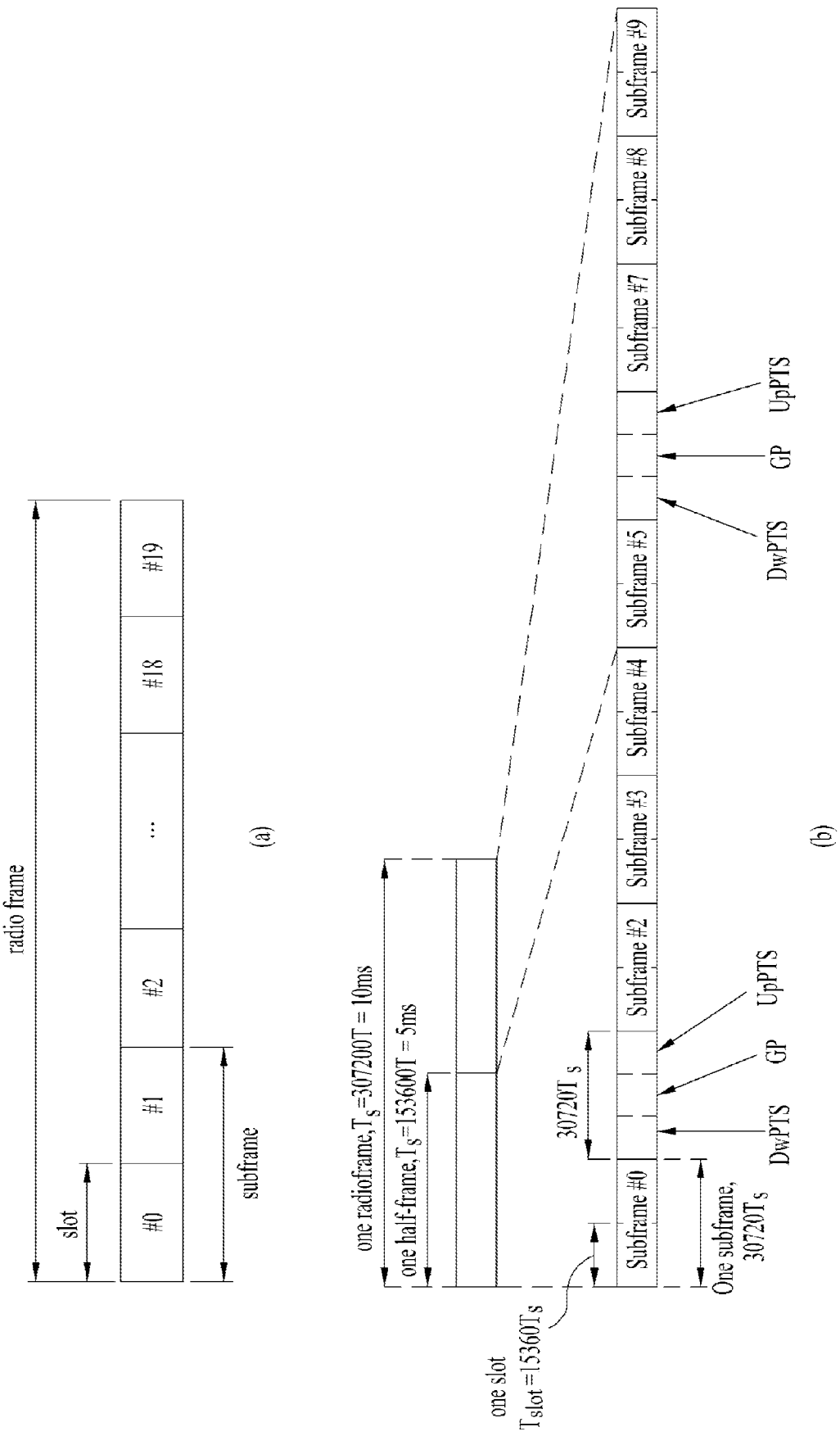
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (*a*) shows one example of a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (*b*) shows a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multipath delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
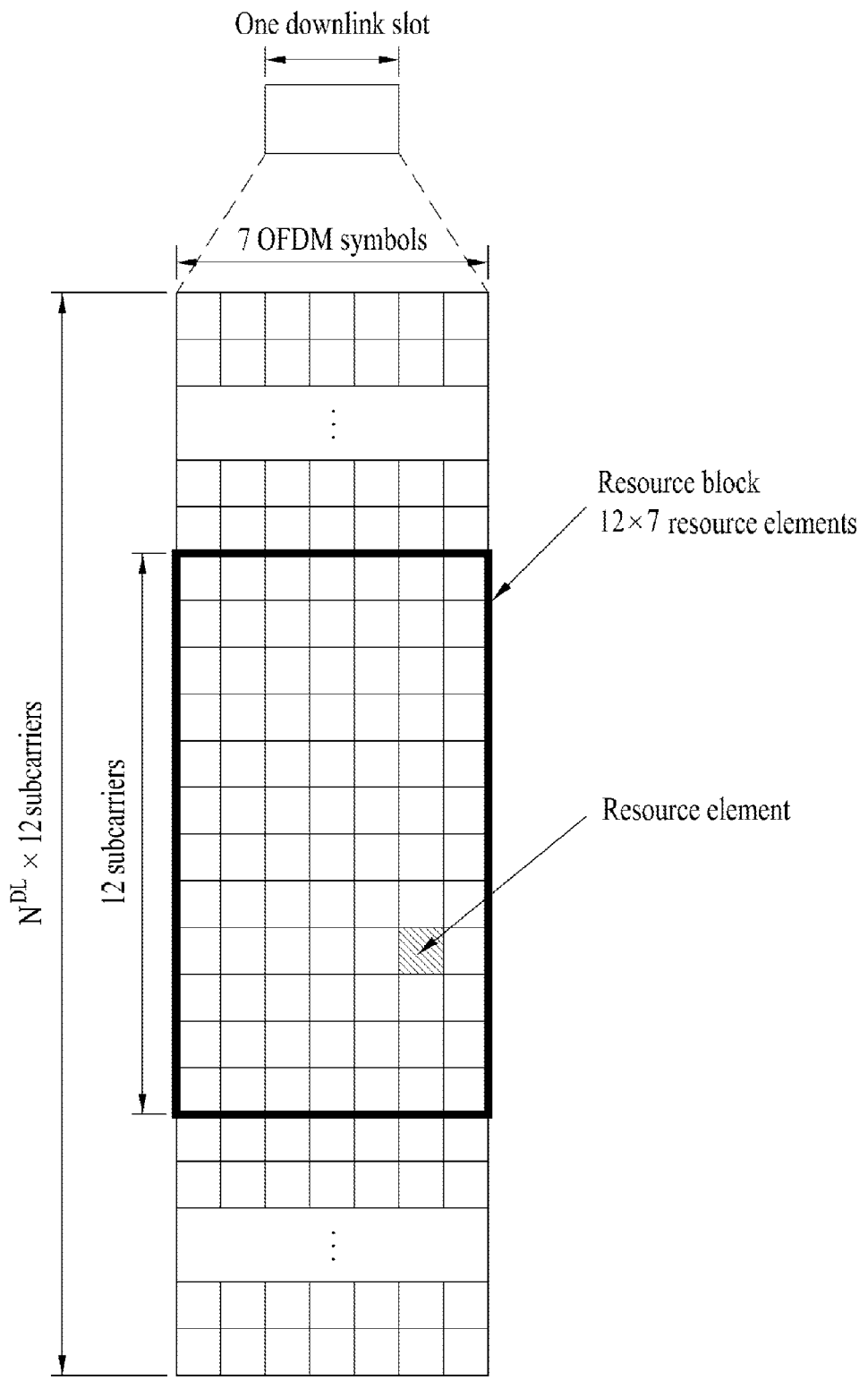
FIG. 3 is a diagram for one example of a resource grid for a downlink slot.

FIG. 3 is a diagram for one example of a resource grid for a downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
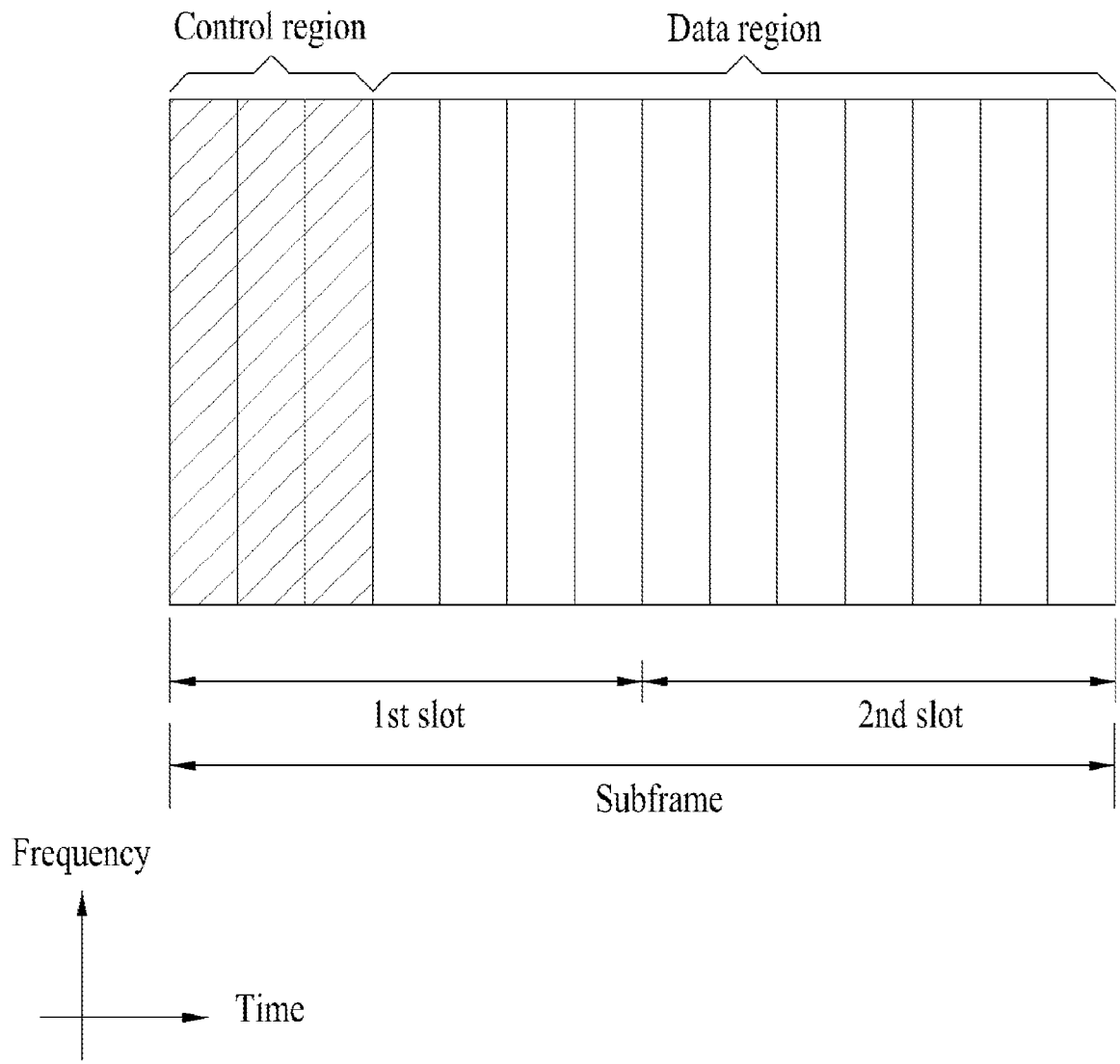
FIG. 4 is a diagram for a structure of a downlink subframe.

FIG. 4 shows a structure of a downlink (DL) subframe.

Referring to FIG. 4, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

Figure 5:
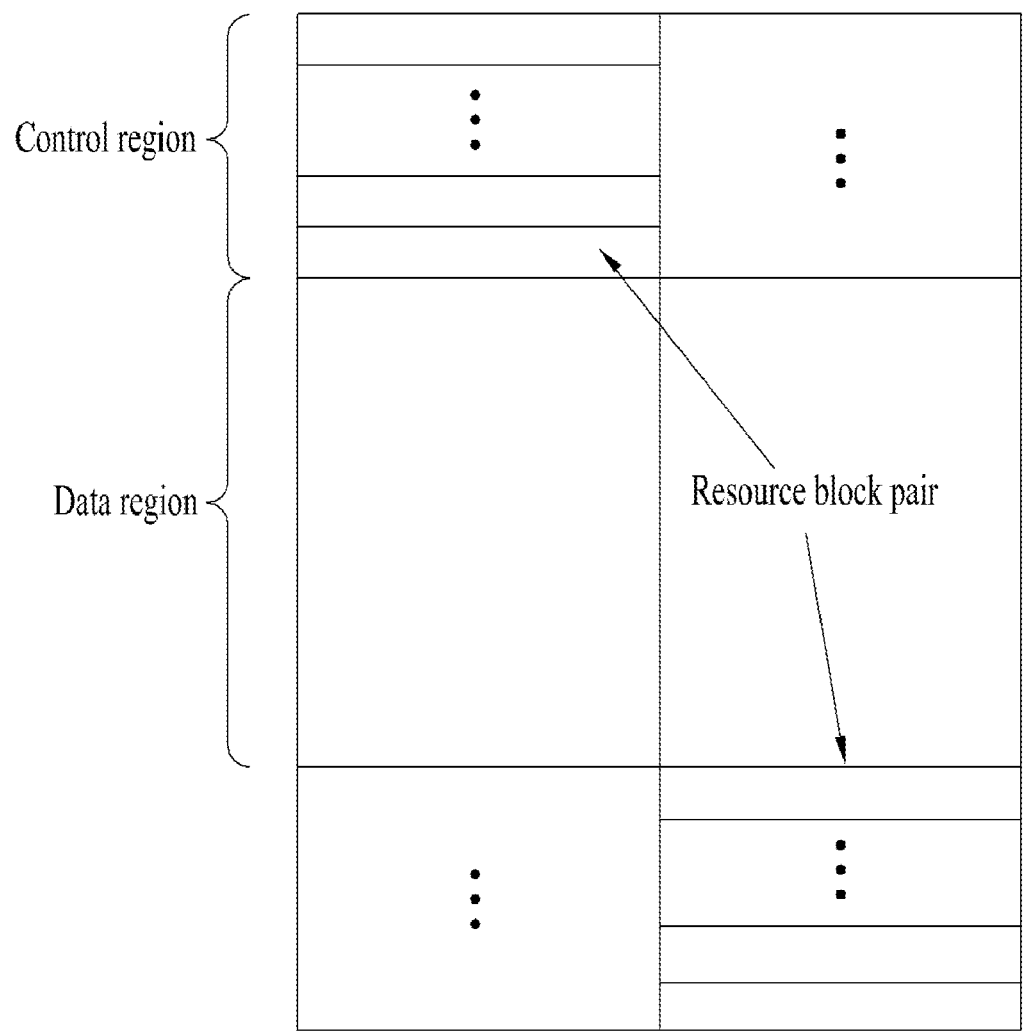
FIG. 5 is a diagram for a structure of an uplink subframe.

FIG. 5 shows a structure of an uplink (UL) subframe.

Referring to FIG. 5, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

2. The General of D2D (Device-to-Device) Communication

In a short range communication, a communication between user equipments (i.e., D2D communication) may be generally defined as a peer-to-peer form. These communication subjects reciprocally perform a communication by defining a random access protocol in-between and do not need to consider whether one of the communication subjects is actually connected to a public internet network.

On the contrary, a communication in a cellular network should be defined as a communication between a base station and a user equipment or a communication between an entity equivalent to a base station and a user equipment. And, the whole communication behaviors are controlled by the base station or the entity equivalent to the base station. Under this protocol, the cellular network restricts behaviors of all user equipments by a predetermined rule, thereby enabling a structure for obtaining maximum throughput. Yet, this rule may have over-ruled aspects depending on an application or a channel environment of a user equipment. For instance, a base station determines a power to be consumed for a transmission of the same data traffic by a user equipment and all behaviors of the user equipment for the transmission of the same data traffic should work under the control of the base station in a manner that the base station is placed in the middle for a short range communication as well. In order to achieve a short range communication with low power consumption, a user equipment should have a structure of utilizing another radio access technology (RAT) or accept the inconvenience of the cellular network. According to such a structural problem, since a channel environment of a user equipment is vulnerable, when the user equipment accesses a network, some restrictions are put on the user equipment that uses an optimal communication path by searching for a new access path.

FIG. 6 and FIG. 7 are diagrams for examples of applying a D2D communication.

If a propagation loss between a source user equipment and a base station is considerable or a channel equality is equal to or lower than a predetermined level, a D2D communication can be triggered. For instance, referring to FIG. 6 (a), when a plurality of devices are located in a room, a channel status may be changed depending on a user equipment location. Hence, the source user equipment can improve data throughput through a D2D communication or raise a data reception quality. Moreover, referring to FIG. 6 (b), as a source user equipment is located on an alley between tall buildings, although the source user equipment is included in a radio shadow area, if the source user equipment has a good channel state with another nearby user equipment, the source user equipment communicates with the nearby user equipment and the user equipment in a good channel state communicates with a base station. Therefore, it is able to enhance power efficiency and throughput of the user equipment that becomes a source of data traffic. Thus, if a plurality of user equipments exist and are managed, when a server accesses each of the user equipments through a base station, it is able to consider a model that a specific user equipment plays a role as an aggregator for a plurality of the user equipments.

For another instance, referring to FIG. 7, if a user equipment intends to communicate with a nearby user equipment by utilizing an RAT of cellular only without using an RAT different from that of the cellular, a corresponding data exchange is controlled by a base station. Yet, even if user equipments are located so close to each other, data transceived between the user equipments should be forwarded to a base station and then retransmitted to the destined user equipment. Thus, such a structure is companied by an unreasonable communication structure. In doing so, if an owner, which manages user equipments performing a direct D2D communication, manages the corresponding user equipments in a manner of being located adjacent to the corresponding user equipments, it is preferable that data is directly delivered to a managed user equipment of the corresponding owner rather than forwarded to a base station.

In doing so, comparing the above-mentioned case to a case of using another RAT (e.g., WiFi, Bluetooth, Zigbee, etc.), since a user equipment does not need to include a model for multiple RATs, it is able to configure an inexpensive eco-system. Since the multiple RATs are not used, it is unnecessary to implement a processing configuration for unnecessary application layers. Moreover, if an air-interface for a D2D communication and an air-interface for a UE-to-BS (user equipment-to-base station) communication are combinably designed on the single-RAT basis, it is able to overcome the inefficiency in case that the air-interfaces are independently designed on the multi-RAT basis. In particular, if a short range communication and a cellular network access are allowed by utilizing a single RAT, it is able to configure an eco-system of very efficient D2D devices. These features are applicable to user devices (i.e., human devices) likewise. In doing so, it is able to perform both a short range communication and a long range communication through a device of less complexity with small power. And, it is possible to perform an active QoS (quality of service) management for efficiently maintaining a power consumption level and a throughput management.

In the following description, a direct D2D communication means a method of performing a direct communication between user equipments without using a base station in a situation that a channel state between at least two user equipments is good or user equipments are located adjacent to each other. In doing so, although data is exchanged between the user equipments through the direct communication, the D2D communication associated with the present invention differs from such a communication for exchanging data between user equipments without involvement of a base station as a Bluetooth communication, an infrared ray communication and the like in that prescribed control information for a D2D communication is provided by a base station.

The aforementioned direct D2D communication can be used together with such a terminology as a device-to-device (D2D) communication, a mobile station-to-mobile station (MS-to-MS, M2M) communication, a peer-to-peer (P2P) communication and the like. For clarity of the following description, 'D2D communication' is generally used to describe embodiments of the present invention. And, 'D2D UE (user equipment)' means a user equipment (UE) that supports a D2D communication.

3. Method of Transmitting a D2D Reference Signal

In case that a D2D communication is performed by sharing resource with an existing cellular network, it may cause a problem that synchronization between a user equipment currently performing a cellular network communication and a D2D user equipment currently performing the D2D communication is mismatched or a problem that synchronization between D2D user equipments currently performing the D2D communication with different D2D user equipments is mismatched. In case of the user equipment currently using the cellular network, although the corresponding user equipment transmits a signal by acquiring synchronization with a base station, since the user equipment currently using the cellular network differs from the D2D user equipment currently performing the D2D communication in delays attributed to paths, inter-carrier interference is caused to the D2D user equipment currently performing the D2D communication due to the mismatch of the synchronization. Hence, a method of preventing performance degradation due to the inter-carrier interference is necessary.

In case of a D2D communication, although a D2D user equipment can acquire coarse synchronization mutually using a base station of a cellular network, since the D2D user equipment differs from the cellular network in path, it may cause a problem that fine synchronization between D2D user equipments performing a direct communication with each other is different from synchronization between D2D user equipments currently performing the D2D communication with different D2D user equipments. Besides, it may be difficult to transmit data on a DL channel structure due to hardware (H/W) limitation of a D2D user equipment in a D2D communication. And, it may be preferable that data is transmitted on a UL channel structure. In this case, a reference signal (or a synchronization signal) for acquiring fine synchronization is required for a D2D communication between D2D user equipments performing the D2D communication. In particular, unlike the cellular network, in a direct communication unable to avoid restrictions put on transmission powers of transmitting and receiving D2D user equipments to minimize interference with other user equipments, since a process for acquiring synchronization precisely is closely related to data transmission performance, it is very important to set up a reference signal for synchronization. In the following description, the present invention proposes a method of solving a problem due to mobility and synchronization mismatch of D2D user equipments in a D2D communication and a method of setting up fine synchronization between D2D user equipments. For clarity of the following description, a signal for acquiring synchronization between D2D user equipments for a D2D communication shall be named 'D2D reference signal'.

Figure 8:
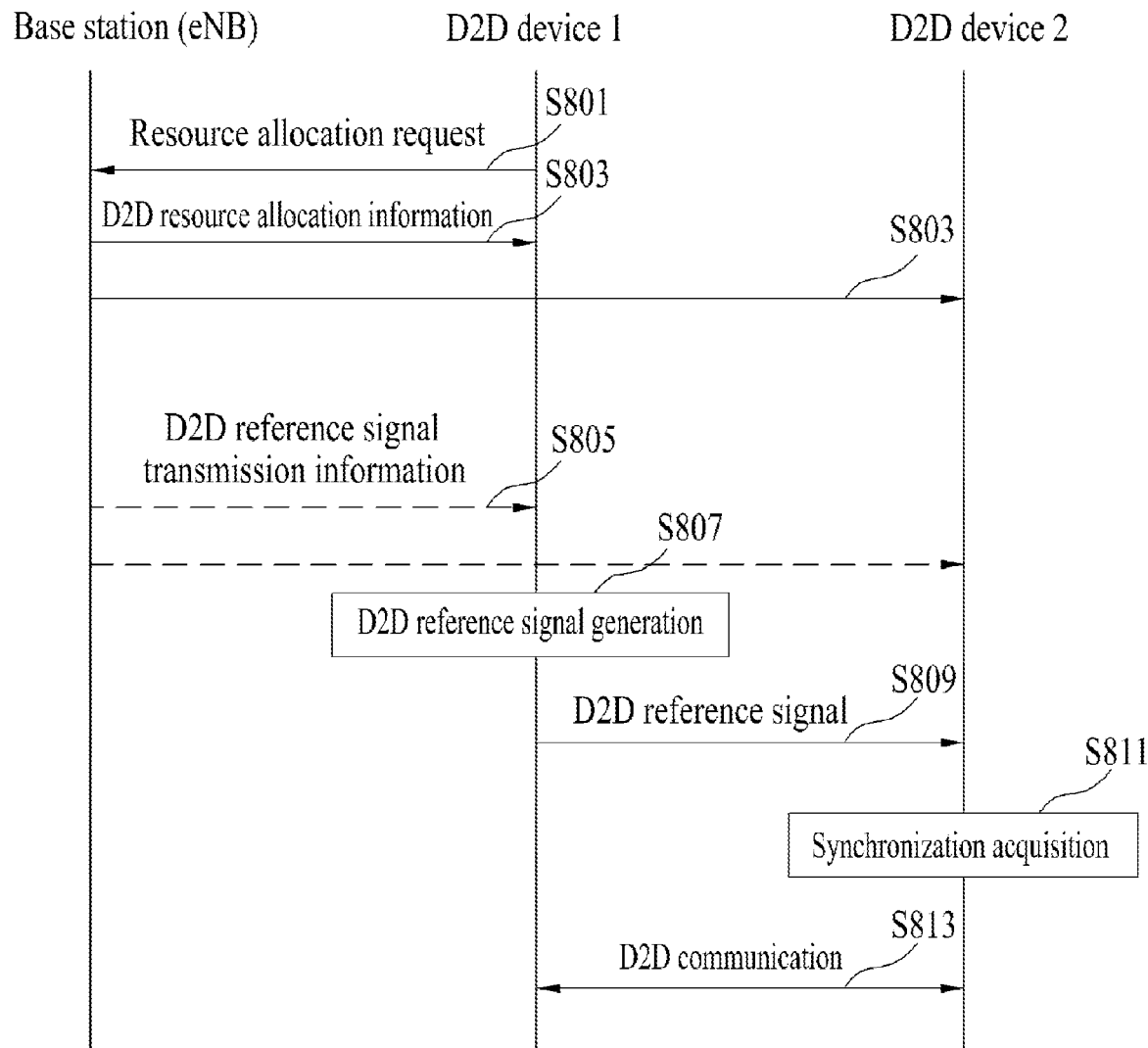
FIGS. 8 to 13 are diagrams for examples of a method of transmitting a D2D reference signal according to one embodiment of the present invention.

FIG. 8 is a diagram for one example of a method of transmitting a D2D reference signal according to one embodiment of the present invention.

Referring to FIG. 8, a D2D user equipment 1 intending to initiate a D2D communication with a D2D user equipment 2 can make a request for a resource allocation for the D2D communication to a base station [S801]. In doing so, the D2D user equipment 1 can transmit an identification information of the D2D user equipment 2 together.

Having received the resource allocation request from the D2D user equipment 1, the base station can transmit a resource information for the D2D communication to each of the D2D user equipment 1 and the D2D user equipment 2 [S803]. In particular, the base station transmits a resource allocation information to the D2D user equipment 1 having requested a resource for the D2D communication and the D2D user equipment 1 may be then able to forward the resource allocation information received from the base station to the D2D user equipment 2.

The base station can transmit a D2D reference signal transmission information to each of the D2D user equipment 1 and the D2D user equipment 2. In this case, the D2D reference signal transmission information may include an allocation information (e.g., a D2D reference signal carried symbol index, a D2D reference signal carried frequency band, etc.) of a resource for carrying a D2D reference signal, a sequence information of the D2D reference signal and/or the like. Yet, for clarity of the description with reference to FIG. 8, the step of transmitting the D2D reference signal transmission information is performed after the step of transmitting the D2D resource allocation information, by which the present invention may be non-limited. Alternatively, the step of transmitting the D2D reference signal transmission information is performed before the step of transmitting the D2D resource allocation information. In particular, the step S805 may be performed before the step S801.

Moreover, the D2D reference signal transmission information can be transmitted to each of the D2D user equipments in a manner of being contained in the D2D resource allocation information, and the D2D reference signal information may be previously determined so as to be known to the base station and the D2D user equipments in advance. In this case, the step S805 of transmitting the D2D reference signal transmission information can be skipped.

The D2D user equipment 1 generates a D2D reference signal for acquiring synchronization with the D2D user equipment 2 [S807] and then transmits the generated D2D reference signal to the D2D user equipment 2 [S809]. In particular, the D2D user equipment 1 can transmit the D2D reference signal to the D2D user equipment 2 in a manner of mapping the D2D reference signal to the resource allocated through the D2D reference signal transmission information or in a manner of mapping the D2D reference signal to a preset resource.

Thereafter, the D2D user equipment 2 acquires synchronization with the D2D user equipment 1 using the received D2D reference signal [S811]. After the D2D synchronization has been acquired, the D2D user equipment 1 and the D2D user equipment 2 perform the D2D communication with each other [S813].

The D2D reference signal for acquiring the synchronization between the D2D user equipments in the D2D communication can be set as follows.

3.1. Frequency Band for Reference Signal Transmission 3.1.1. Mapping to Assigned Full Frequency Band A D2D reference signal for acquiring synchronization of a D2D communication can be mapped across a full frequency band in a manner of selecting a specific symbol of an allocated physical resource block/resource block (PRB/RB).

Figure 9:
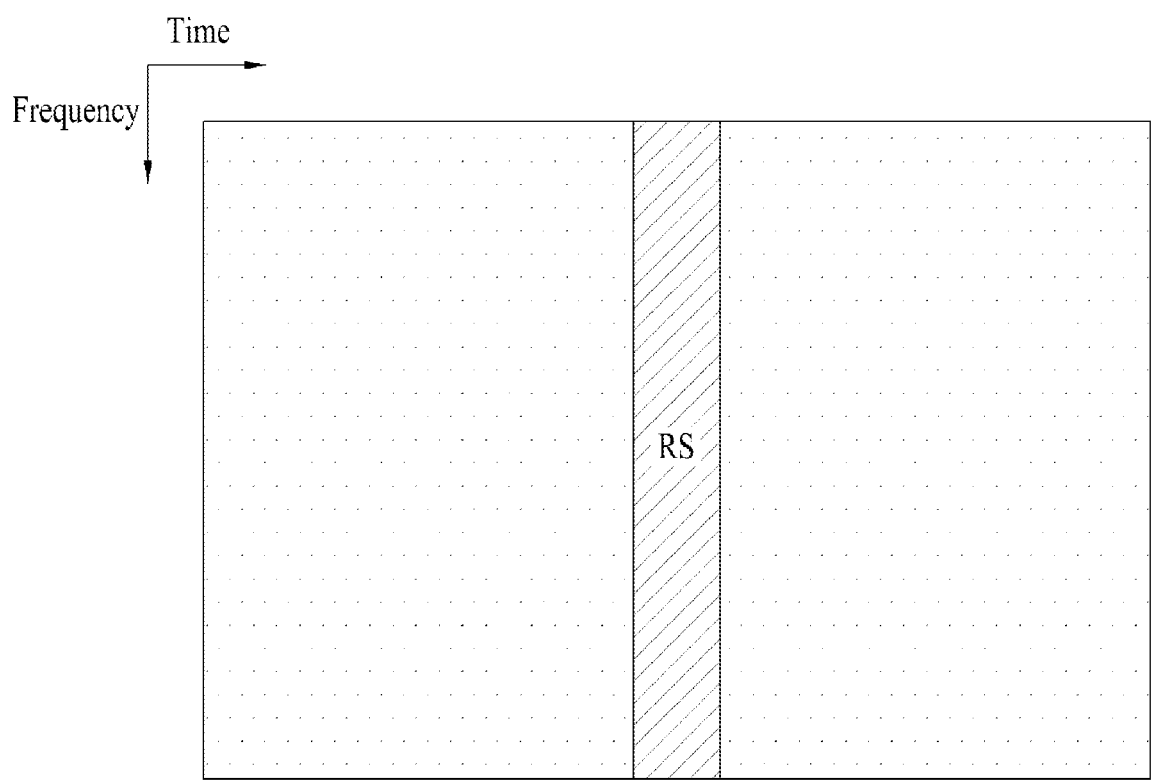

FIG. 9 is a diagram for one example of a structure of a subframe having a D2D reference signal transmitted therein according to one embodiment of the present invention.

Referring to FIG. 9, a D2D reference signal for acquiring synchronization of a D2d communication is located at a determined symbol of an allocated PRB/RB, which is located across an assigned full frequency band. In particular, the D2D reference signal is transmitted on a full frequency band in a symbol of a corresponding time. In this case, as information on a sequence of the D2D reference signal and the like is determined previously, a D2D user equipment and a base station may be aware of such information. And, the base station may be able to provide the corresponding information through RRC (radio resource control) signaling or cell common control information.

The number of symbols having the D2D reference signal mapped thereto may be at least one per subframe (or radio frame). For instance, the D2D reference signal can be mapped to 2 symbols per subframe in a manner of being mapped to 1 symbol per 1 subframe or 1 symbol per 1 slot. In doing so, in case that the D2D reference signal is mapped to 1 symbol per 1 subframe, the mapping location may correspond to a symbol located at the center of a $1^{st}$ slot (or a $2^{nd}$ slot). In case that the D2D reference signal is mapped to 1 symbol per 1 slot, the mapping location may correspond to a symbol located at the center of each slot. For instance, in case of a normal cyclic prefix, the D2D reference signal can be mapped to a $4^{th}$ symbol of a slot. In case of an extended cyclic prefix, the D2D reference signal can be mapped to a $3^{rd}$ or $4^{th}$ symbol of a slot.

In this case, if a signal is not transmitted on a partial frequency band of the full frequency band of the allocated PRB/RB due to a reason such as an interference management and the like, the D2D reference signal may not be mapped to the corresponding frequency band.

Thus, the D2D reference signal for acquiring the synchronization between D2D user equipments can be used for a channel estimation (or a channel quality measurement) as well as for the synchronization between D2D user equipments.

Meanwhile, as mentioned in the foregoing description, it may be difficult to transmit data on a DL channel structure due to hardware (H/W) limitation of a D2D user equipment in a D2D communication. And, it may be preferable that data is transmitted on a UL channel structure. In this case, a separate reference signal (or a synchronization signal) for the D2D user equipment to acquire synchronization between D2D user equipments may not be defined. For instance, in case that D2D user equipments mutually perform a D2D communication using a UL channel structure of 3GPP LTE/LTE-A system, it is able to acquire synchronization between the D2D user equipments using a UL reference signal (e.g., a demodulation reference signal (DMRS)).

In doing so, since the D2D user equipment receiving data through the D2D communication should be aware of information on a reference signal of the D2D user equipment transmitting the data, a base station is able to inform the data receiving D2D user equipment of the information on the reference signal. For instance, the base station can inform the data receiving D2D user equipment of information such as a region of a resource block allocated to the D2D user equipment transmitting the data through the D2D communication, a sequence of the reference signal, and/or the like. In doing so, the base station is able to inform the data receiving D2D user equipment of the corresponding information using RRC signaling or PDSCH. Moreover, the base station defines a new downlink control information (DCI) format and is able to inform the data receiving D2D user equipment of the information through PDCCH using the newly defined DCI format.

Thus, in case of performing the D2D communication using the UL channel structure, the process for acquiring the synchronization between D2D user equipments and the channel estimation process can be performed as follows.

First of all, when synchronization for a D2D communication is initially set, a D2D user equipment receiving data through the D2D communication is able to acquire the synchronization by reading a D2D reference signal only while ignoring data carried on PRB/RB having the D2D reference signal carried thereon. Subsequently, the data receiving D2D user equipment acquires the synchronization using the D2D reference signal and then receives the data by starting with a subframe scheduled to transmit D2D data. From this time on, the D2D reference signal can play roles for synchronization correction and channel estimation.

Moreover, when synchronization for a D2D communication is initially set, a D2D user equipment transmitting a D2D reference signal is able to transmit a resource information for a response to a counterpart D2D user equipment. In particular, if the D2D user equipment receiving the D2D reference signal fails in receiving allocation of a resource for a response to the D2D reference signal from a base station, the D2D user equipment transmitting the D2D reference signal is able to transmit the resource information for the response together with the D2D reference signal.

Figure 10:
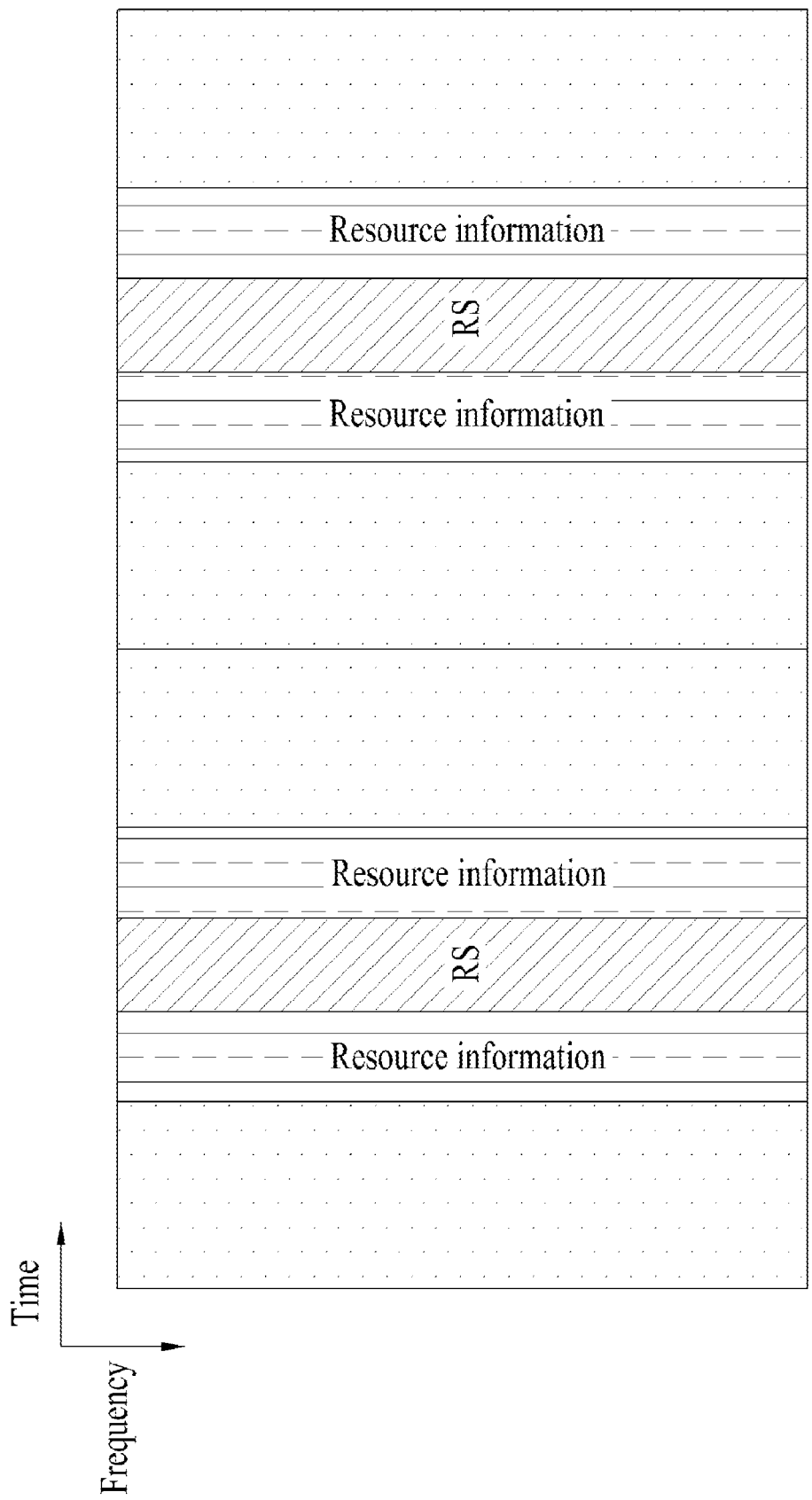

FIG. 10 is a diagram for one example of a structure of a subframe having a D2D reference signal transmitted therein according to one embodiment of the present invention.

Referring to FIG. 10, a resource information for a response to a D2D reference signal for synchronization can be transmitted in form of data except the D2D reference signal (RS). In this case, the resource information for the response to the D2D reference signal can be mapped to symbols located next to both sides of the D2D reference signal. And, the resource information can be mapped to a full frequency band assigned to a D2D user equipment like the D2D reference signal. Moreover, the resource information can be mapped to a band partially determined in an increasing direction (e.g., a bottom-to-top direction) of a subcarrier index from a smallest carrier index.

In case that at least one D2D reference signal is mapped per 1 subframe, the resource information for the response to the D2D reference signal can be mapped to symbols located next to both sides of the D2D reference signal transmitted in a prescribed slot (e.g., a $1^{st}$ slot, a $2^{nd}$ slot, etc.) of a subframe. And, the resource information can be mapped to a full frequency band assigned to a D2D user equipment like the D2D reference signal. Moreover, the resource information can be mapped to a band partially determined in an increasing direction (e.g., a bottom-to-top direction) of a subcarrier index from a smallest carrier index.

Unlike the example shown in FIG. 5, the resource information for the response to the D2D reference signal is not transmitted in form of data separate from the D2D reference signal but can be transmitted in a manner of being included in the D2D reference signal. For instance, the resource information for the response to the D2D reference signal can be included in form of an initial value or phase of the D2D reference signal.

3.1.2. Mapping to Portion of Assigned Frequency Band

A D2D reference signal for synchronization of a D2D communication between D2D user equipments can be located not on a full frequency band assigned to a D2D user equipment but on a partial frequency band in a designated symbol in a manner different from that of (3.1.1.). In this case, a resource (e.g., a resource element) to which the D2D reference signal for the synchronization is mapped may differ depending on a frequency bandwidth assigned to the D2D user equipment or the number of PRBs/RBs allocated to the D2D user equipment. Described in the following is the case that a D2D reference signal for synchronization of a D2D communication between D2D user equipments is located not on a full frequency band but on a partial frequency band.

First of all, a D2D reference signal for synchronization of a D2D communication can be mapped across a partial frequency band of PRB/RB assigned to a user equipment in a designated symbol. A base station is able to inform a data receiving D2D user equipment of an information on a region of a resource block allocated to a D2D user equipment transmitting data through a D2D communication. Since such information as a sequence of the D2D reference signal and the like is already determined, the corresponding information may be already known to the D2D user equipment and the base station. Alternatively, the base station may be able to provide the D2D user equipment with the corresponding information through RRC (radio resource control) signaling or cell common control information.

1) The number of symbols having a D2D reference signal mapped thereto may become at least 1 per 1 subframe (or radio frame). For instance, the D2D reference signal can be mapped to 2 symbols per subframe in a manner of being mapped to 1 symbol per 1 subframe or 1 symbol per 1 slot. In doing so, in case that the D2D reference signal is mapped to 1 symbol per 1 subframe, the mapping location may correspond to a symbol located at the center of a $1^{st}$ slot (or a $2^{nd}$ slot). In case that the D2D reference signal is mapped to 1 symbol per 1 slot, the mapping location may correspond to a symbol located at the center of each slot. For instance, in case of a normal cyclic prefix, the D2D reference signal can be mapped to a $4^{th}$ symbol of a slot. In case of an extended cyclic prefix, the D2D reference signal can be mapped to a $3^{rd}$ or $4^{th}$ symbol of a slot.

2) A D2D reference signal for a D2D communication may be located in a designated symbol and can be mapped in a manner of scattering across a full band of PRB/RB allocated to a user equipment (or in accordance with a specific pattern). In this case, a scattering unit may include a unit of a single resource element or a unit of several resource elements. For instance, at least one resource element having a D2D reference signal mapped thereto and a resource element having the D2D reference signal not mapped thereto in a designated symbol can be alternately located in a manner of being distributed across a full frequency band of PRB/RB.

3) A D2D reference signal for a D2D communication may be located in a designated symbol and can be mapped in a manner of forming a group with consecutive resource elements on a partial band of PRB/RB allocated to a user equipment. In this case, the D2D reference signal for the D2D communication may be located on both sides centering on a center frequency (e.g., a center band, a DC subcarrier, etc.) of PRB/RB, which is allocated to the D2D user equipment, of the designated symbol as many as the number of the same resource elements.

In case of a controlled/centralized D2D communication for a base station to control resource allocation of a D2D user equipment and the like, as mentioned in the foregoing description, when a reference signal for synchronization between D2D user equipments is mapped across a partial frequency band by selecting symbol of PRB/RB allocated to a user equipment from designated symbols, a base station can inform the user equipment of information on a resource (e.g., a resource element) to which a D2D reference signal is mapped.

The information on a resource (e.g., a resource element) to which a D2D reference signal is mapped can be delivered to the D2D user equipment on PDCCH or a common search space (CSS) through a common control information. In this case, the CSS can be defined in a PDSCH region or an E-PDCCH region and can be applied to a user equipment after 3GPP LTE/LTE-A Rel-10. Through the CSS located in the PSCH region or the E-PDCCH region, the information on the resource (e.g., a resource element) to which the D2D reference signal is mapped can be transmitted. Moreover, a new DCI format is defined instead of a previously defined DCI format and the information on the resource (e.g., a resource element) to which the D2D reference signal is mapped can be then transmitted in a manner of channel-coded suitably for the newly defined DCI format. In this case, the new DCI format can be configured by a unit greater or smaller than that of a control channel element (CCE). Thus, in case that the information on the resource to which the D2D reference signal is mapped is delivered through the CSS, it can be always located at one or more designated CCEs (e.g., one CCE, multiple CCEs, etc.). For instance, the corresponding information can be located at the foremost (i.e., a smallest index) CCEs or the last (i.e., a biggest index) CCEs.

Moreover, the information on the resource (e.g., a resource element) to which the D2D reference signal is mapped can be transmitted to the D2D user equipment through RRC signaling or PBCH (physical broadcast channel).

3.2. Control of Interference with Cellular Network

In case that a D2D communication for directly exchanging data between user equipments is performed by sharing resource with an existing cellular network, it may cause a problem that synchronization between a user equipment currently performing a cellular network communication and a D2D user equipment currently performing the D2D communication is mismatched or a problem that synchronization between D2D user equipments currently performing the D2D communication with different D2D user equipments is mismatched. In case of the user equipment currently using the cellular network, although the corresponding user equipment transmits a signal by acquiring synchronization with a base station, since the user equipment currently using the cellular network differs from the D2D user equipment currently performing the D2D communication in delays attributed to paths, inter-carrier interference is caused to the D2D user equipment currently performing the D2D communication due to the mismatch of the synchronization. Hence, when a resource is allocated to a D2D user equipment to perform a D2D communication, in order to prevent interference with a cellular network and performance degradation due to the interference, it is able to set up a guard band/channel by emptying or muting a portion of the resource allocated to the D2D user equipment.

Figure 11:
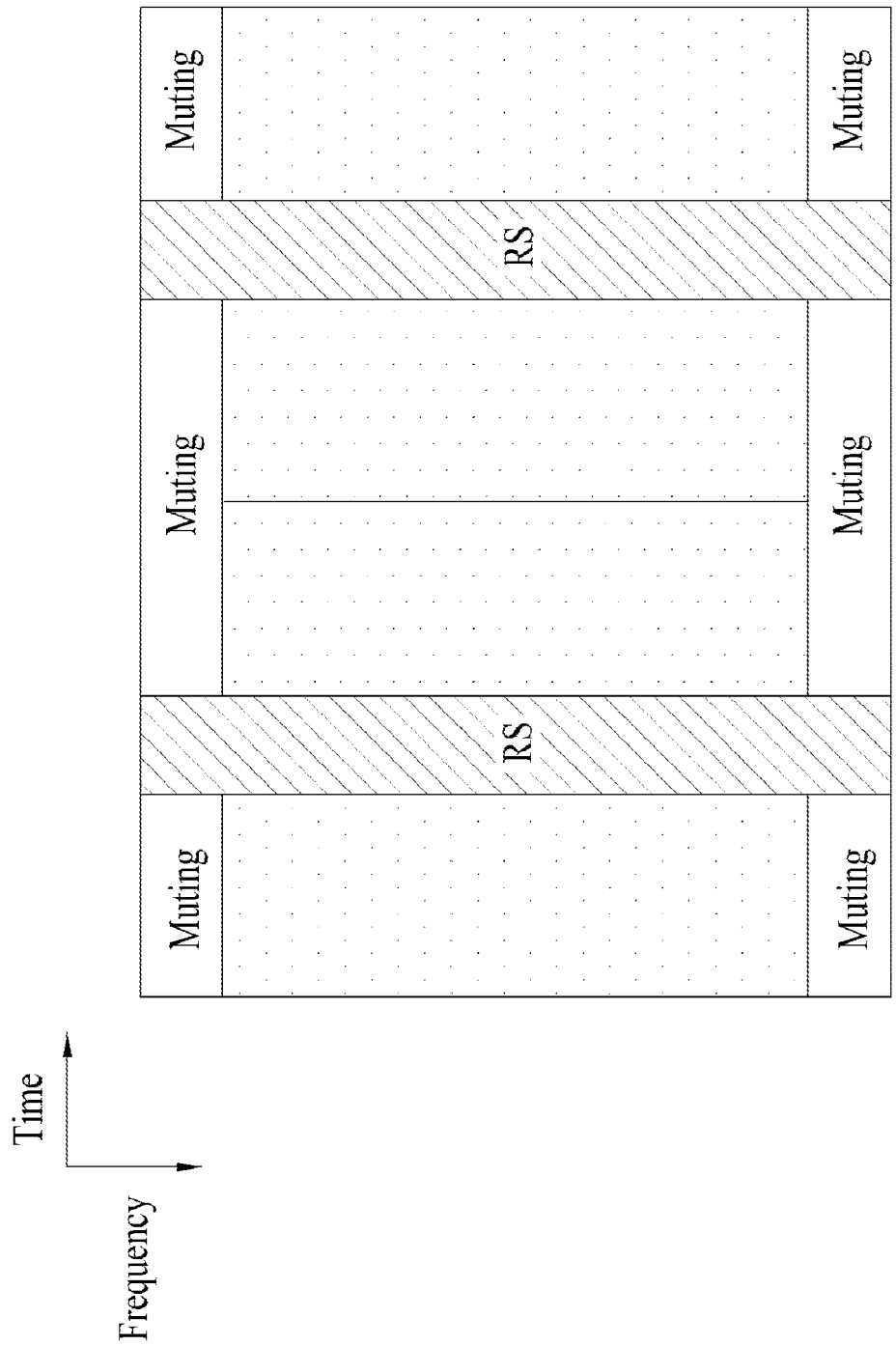

FIG. 11 is a diagram for one example of a structure of a subframe having a D2D reference signal transmitted therein according to one embodiment of the present invention.

Referring to FIG. 11, when resource is allocated to a D2D user equipment to perform a D2D communication, in order to prevent interference with a cellular network, data is not transmitted on portions of both ends of a frequency band of the resource allocated to the D2D user equipment or can be muted. In particular, the data is not transmitted on the portions of both of the ends of the frequency band in a substantially data transmitted region except symbols for carrying a D2D reference signal or the corresponding data can be muted. In this case, a control information can be transmitted together with the data in a manner of being multiplexed with the data in the data transmitted region.

A unit of muting data can become a resource element. For instance, data is not transmitted during all the time amounting to total 1 RB by 6 resource elements on both ends of a frequency band of an assigned common channel (e.g., a data transport channel) or the corresponding data can be muted. Moreover, a unit of muting data can become PRB/RB. For instance, data is not transmitted during all the time by 1 PRB on both ends of a frequency band of an assigned common channel (e.g., a data transport channel) or the corresponding data can be muted. In doing so, both of the ends of the frequency band can be muted identically or differently.

Figure 12:
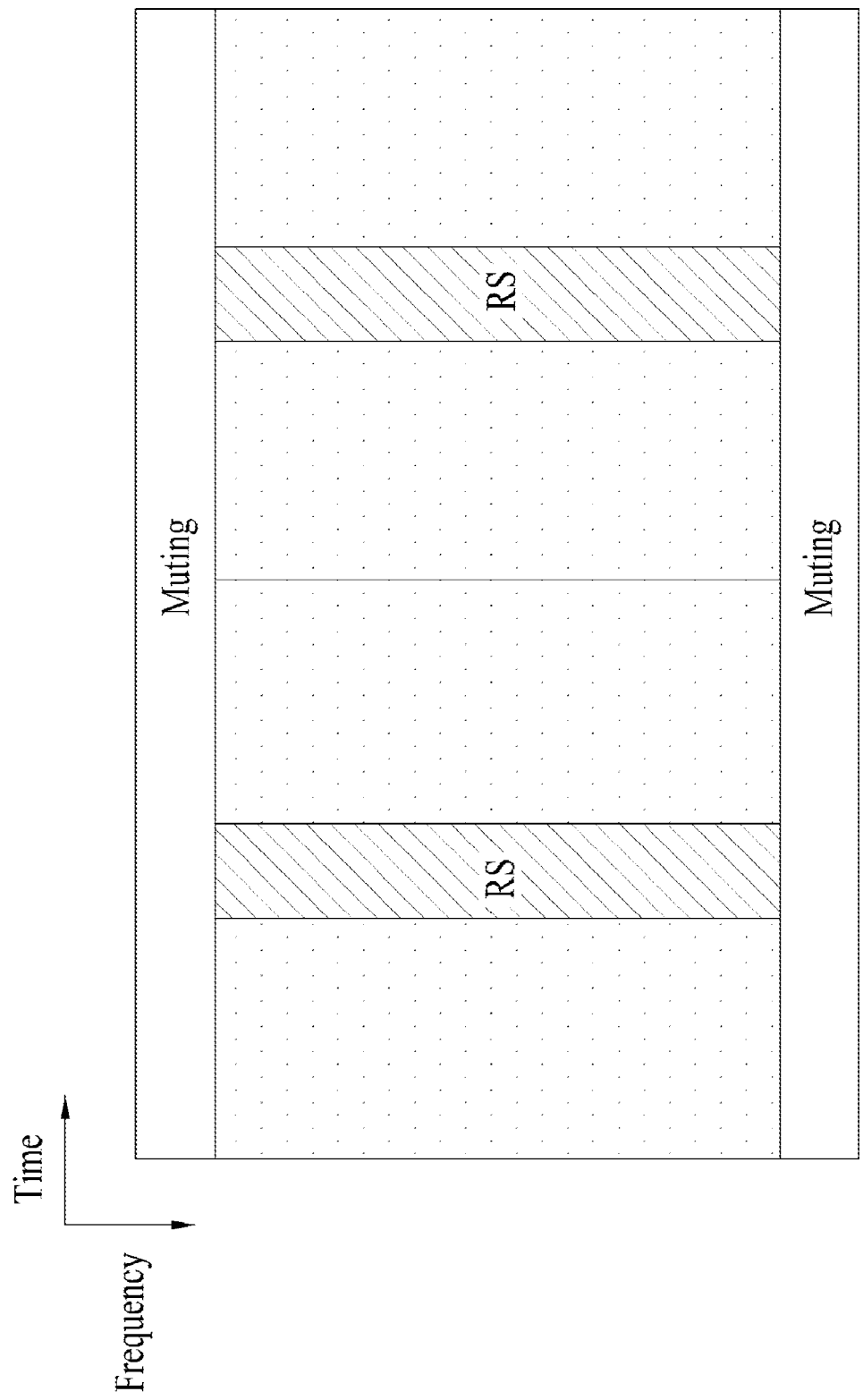

FIG. 12 is a diagram for one example of a structure of a subframe having a D2D reference signal transmitted therein according to one embodiment of the present invention.

Referring to FIG. 12, when resource is allocated to a D2D user equipment to perform a D2D communication, in order to prevent interference with a cellular network, data is not transmitted on portions of both ends of a frequency band of the resource allocated to the D2D user equipment or can be muted. In particular, unlike FIG. 11, any data including a control signal (or a reference signal) is not transmitted on a frequency band set as a guard band and can be muted. In this case, a control information can be transmitted together with the data in a manner of being multiplexed with the data in the data transmitted region.

A unit of muting data can become a resource element. For instance, data is not transmitted during all the time amounting to total 1 RB by 6 resource elements on both ends of a frequency band of an assigned common channel (e.g., a data transport channel) or the corresponding data can be muted. Moreover, a unit of muting data can become PRB/RB. For instance, data is not transmitted during all the time by 1 PRB on both ends of a frequency band of an assigned common channel (e.g., a data transport channel) or the corresponding data can be muted. In doing so, both of the ends of the frequency band can be muted identically or differently.

Figure 13:
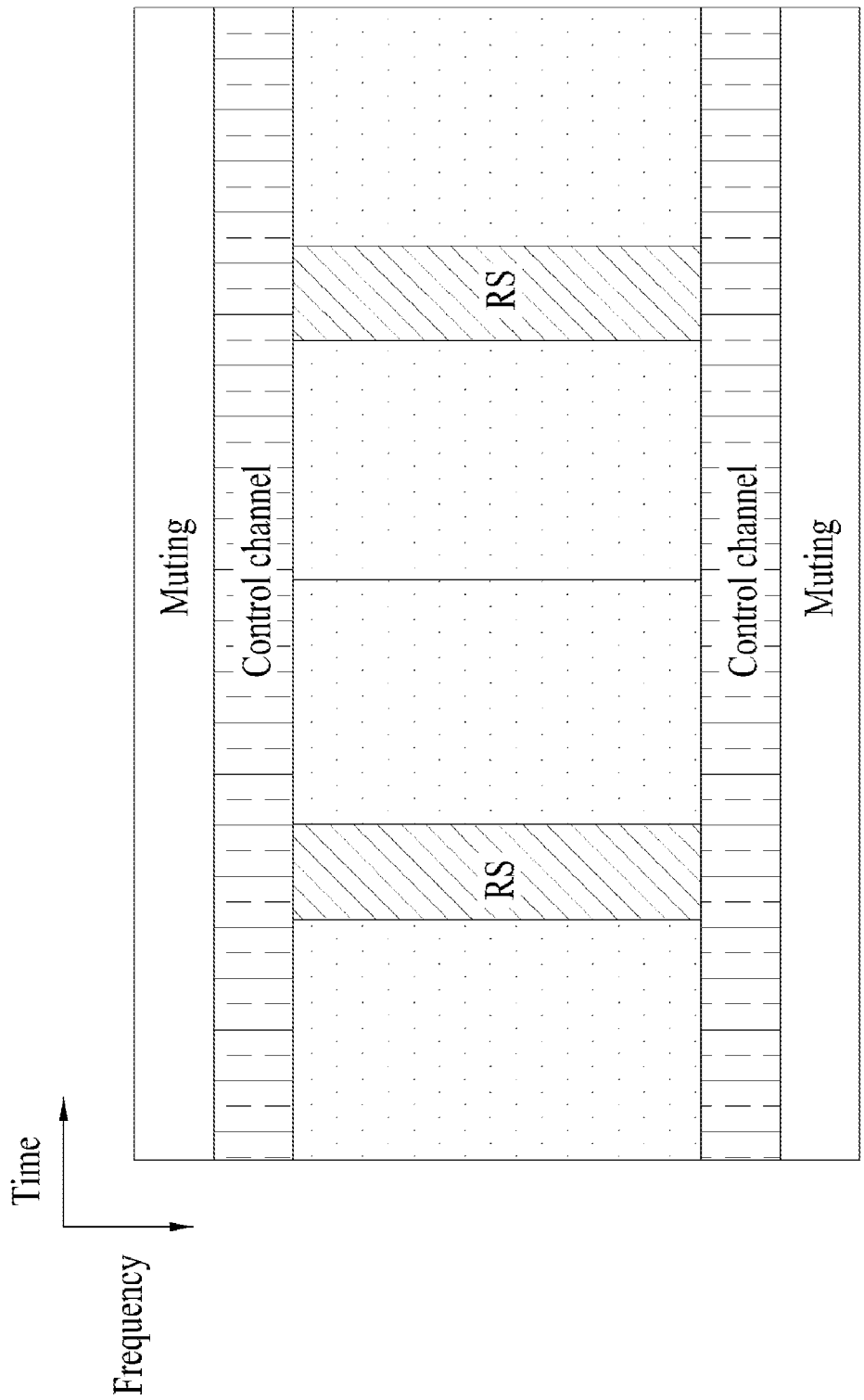

FIG. 13 is a diagram for one example of a structure of a subframe having a D2D reference signal transmitted therein according to one embodiment of the present invention.

Referring to FIG. 13, in case that a control channel is assigned to both ends of a frequency band of a common channel (e.g., a data transport channel) like an uplink, it is able to assign a guard band (or a guard channel) to an outside of the control channel (e.g., PUCCH). In this case, a unit of a muted resource can become PRB/RB. For instance, data is not transmitted during all the time by 1 PRB of an outside frequency band of the assigned control channel or the corresponding data can be muted. And, the muted resource may correspond to 1 PRB or 3 PRBs by adding both of the outside muting frequency bands of the control channel together. In doing so, both of the ends of the frequency band can be muted identically or differently.

4. The General of Device for Implementing the Present Invention

Figure 14:
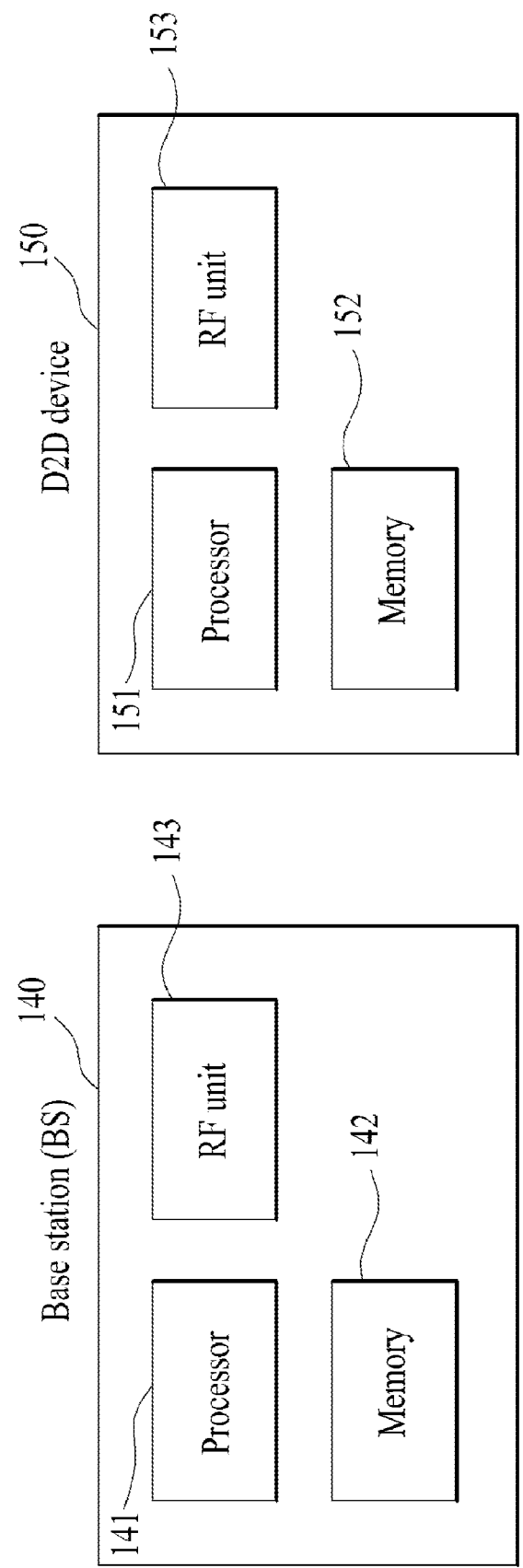
FIG. 14 is a block diagram for a configuration of a wireless communication device according to one embodiment of the present invention.

FIG. 14 is a block diagram for a configuration of a wireless communication device according to one embodiment of the present invention.

Referring to FIG. 14, a wireless communication system may include a base station (BS) 140 and a plurality of user equipments 150 located within an area of the base station 140.

The base station 140 may include a processor 141, a memory 142 and an RF (radio frequency) unit 143. The processor 141 implements the proposed functions, processes and/or methods. Layers of a radio interface protocol can be implemented by the processor 141. The memory 142 is connected with the processor 141 and then stores various kinds of information to drive the processor 141. The RF unit 143 is connected with the processor 141 and then transmits and/or receives radio signals.

The user equipment 150 includes a processor 151, a memory 152 and an RF unit 153. The processor 151 implements the proposed functions, processes and/or methods. Layers of a radio interface protocol can be implemented by the processor 151. The memory 152 is connected with the processor 151 and then stores various kinds of information to drive the processor 151. The RF unit 153 is connected with the processor 151 and then transmits and/or receives radio signals.

The memory 142/152 may be provided inside or outside the processor 141/151. And, the memory 142/152 may be connected with the processor 141/151 via various kinds of well-known means. Moreover, the base station 140 and/or the user equipment 150 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a data transceiving method in a wireless access system according to the present invention is described with reference to examples applied to 3GPP LTE system, it may be applicable to various kinds of wireless access systems as well as the 3GPP LTE system.

What is claimed is:

1. A method of transmitting signals by a first user equipment (UE) in a wireless communication system supporting direct communication between the first UE and a second UE, the method comprising:
    transmitting, by the first UE to the second UE, a synchronization signal in a subframe, the synchronization signal providing synchronization for the direct communication; and
    transmitting, by the first UE to the second UE, resource information in the same subframe as the synchronization signal, the resource information being used for the direct communication,
    wherein the synchronization signal is mapped to at least one symbol in the subframe, and
    wherein the resource information is mapped to resources which are not used for transmitting the synchronization signal in the subframe.

2. The method of claim 1, wherein the reference synchronization signal is mapped to two symbols in the subframe.

3. The method of claim 1, wherein the synchronization signal is mapped across a full band of a frequency band of a resource allocated for the direct communication between the first UE and the second UE.

4. The method of claim 1, wherein the synchronization signal comprises a demodulation reference signal (DMRS).

5. The method of claim 1, wherein the synchronization signal is mapped to a partial band of a frequency band of the resource allocated for the direct communication between the first UE and the second UE.

6. The method of claim 5, wherein the synchronization signal is mapped consecutively or distributively by a unit of one or more resource elements.

7. The method of claim 1, wherein the synchronization signal is used for synchronization correction and channel estimation after acquiring the synchronization with the second UE.

8. A method of receiving signals by a second user equipment (UE) in a access communication system supporting direct communication between a first UE and the second UE, the method comprising:
    receiving, by the second UE from the first UE, a synchronization signal in a subframe, the synchronization signal providing synchronization for the direct communication; and
    receiving, by the second UE from the first UE, resource information in the same subframe as the synchronization signal, the resource information being used for the direct communication,
    wherein the synchronization signal is mapped to at least one symbol in the subframe, and
    wherein the resource information is mapped to resources which are not used for transmitting the synchronization signal in the subframe.

9. The method of claim 8, wherein the synchronization signal is mapped to two symbols in the subframe.

10. The method of claim 8, wherein the synchronization signal is mapped across a full band of a frequency band of a resource allocated for the direct communication between the first UE and the second UE.

11. The method of claim 8, wherein the synchronization signal comprises a demodulation reference signal (DMRS).

12. The method of claim 8, wherein the synchronization signal is mapped to a partial band of a frequency band of the resource allocated for the direct communication between the first UE and the second UE.

13. The method of claim 12, wherein the synchronization signal is mapped consecutively or distributively by a unit of one or more resource elements.

14. The method of claim 8, wherein the synchronization signal is used for synchronization correction and channel estimation after acquiring the synchronization with the second UE.

15. A user equipment (UE) configured to transmit a signals in a wireless communication system supporting direct communication between the UE and another UE, the UE comprising:
    a radio frequency (RF) unit configured to transceive radio signals; and
    a processor configured to:
        control the RF unit to transmit a synchronization signal to the another UE in a subframe, the synchronization signal providing synchronization for the direct communication, and
        control the RF unit to transmit resource information to the another UE in the same subframe as the synchronization signal, the resource information being used for the direct communication,
    wherein the synchronization signal is mapped to at least one symbol in the subframe, and
    wherein the resource information is mapped to resources which are not used for transmitting the synchronization signal in the subframe.

16. The UE of claim 15, wherein the synchronization signal is mapped to two symbols in the subframe.

17. A user equipment (UE) configured to receive a signals in a wireless communication system supporting direct communication between the UE and another UE, the UE comprising:
    a radio frequency (RF) unit configured to transceive radio signals; and
    a processor configured to:
        control the RF unit to receive a synchronization signal from the another UE in a subframe, the synchronization signal providing synchronization for the direct communication, and
        control the RF unit to receive resource information from the another UE in the same subframe as the synchronization signal, the resource information being used for the direct communication,
    wherein the synchronization signal is mapped to at least one symbol in the subframe, and
    wherein the resource information is mapped to resources which are not used for transmitting the synchronization signal in the subframe.

18. The UE of claim 17, wherein the synchronization signal is mapped to two symbols in the subframe.

* * * * *